Oct. 21, 1924.

W. R. ROYER

CASING OR COVER FOR PNEUMATIC TIRE VALVE STEMS

Filed Aug. 17, 1923

Inventor
William R. Royer.
By his Attorneys
Cooper, Kerr & Dunham

WILLIAM R. ROYER, OF WILKES-BARRE, PENNSYLVANIA.

CASING OR COVER FOR PNEUMATIC-TIRE VALVE STEMS.

Application filed August 17, 1923. Serial No. 657,909.

*To all whom it may concern:*

Be it known that I, WILLIAM R. ROYER, a citizen of the United States of America, residing at Wilkes-Barre, in the county of Luzerne and State of Pennsylvania, have invented certain new and useful Improvements in Casings or Covers for Pneumatic-Tire Valve Stems, of which the following is a full, clear, and exact description.

This invention relates to dustcaps for pneumatic tire valve stems, and its chief object is to provide a cap which is adjustable in length, to fit valve stems which are of different lengths or which project different distances beyond the felloe of the wheel. Another object is to provide an adjustable dustcap or casing for valve stems equipped with a device such as is shown in United States Patent No. 1,304,116, issued to T. J. Stephens, May 20, 1919. To these and other ends the invention comprises the novel features hereinafter described.

In carrying out the invention in the preferred manner I provide two telescoping tubular members, one threaded internally at one end to screw down on the valve stem, and the other adapted to slide smoothly but snugly relatively to the first. One member is also provided with a series of circumferential grooves spaced axially apart, and the other member is provided with means, as for example a circumferential rib or a circumferential series of lugs or bosses to engage one or another of said ribs and thereby holding the two in adjusted position relatively to each other. Preferably, also, the inner member is of such diameter relative to the valve stem that when the device is assembled on the stem the said inner member cannot yield sufficiently to permit disengagement and removal independently of the other.

An embodiment of the type outlined above is shown in the accompanying drawing, in which—

Figure 1:
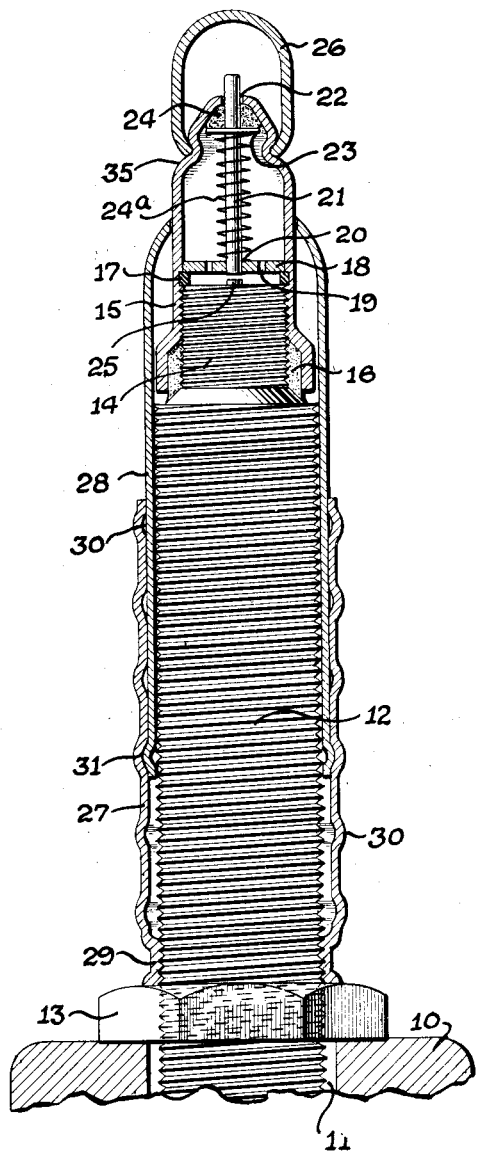
Fig. 1 is a longitudinal section illustrating my improved dustcap in use on a valve stem.
Figure 2:
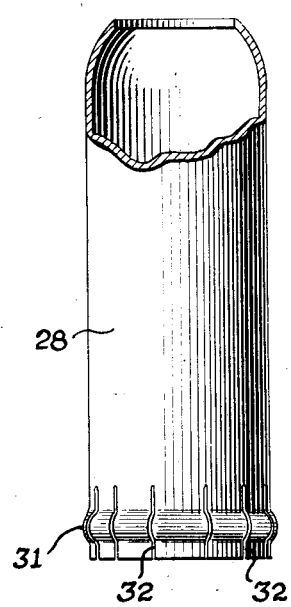
Fig. 2 is a detail side view, partly in section, of the inner telescoping member.

In the drawing, 10 is the felly of an automobile wheel, having an opening 11 for the valve stem 12 of the conventional form, which is threaded throughout its length to receive the nut 13 commonly used to exclude dirt, water, and other foreign matter from the hole 11. At its top or outer end the valve stem is reduced in diameter to provide the threaded nipple 14. Screwed down on the nipple is an internally threaded cap 15, flared at its lower end to receive a compressible or yielding washer or gasket 16. In the cap is a similar washer or gasket 17, mounted in a circumferential groove and extending inwardly beyond the inner surface of the cap so as to seat on the upper edge of the nipple 14 and also to provide a shoulder or rib as a support for the septum or disk 18. The latter is provided with air openings 19, and with a central aperture 20 for the rod or plunger 21 which also projects through an opening 22 in the top of the cap 15. Just below the opening 22 the plunger 21 is equipped with a disk or flange 23, fixed thereon, and on the disk is a yielding washer or packing 24. A coil spring 24$^a$, encircling the reciprocatory rod 21, and bearing on disks 18 and 23, holds the washer or gasket 24 snugly in the tapered upper end of the cap, and holds the rod up out of engagement with the tire-valve plunger 25, which may be a part of any suitable valve, not shown. A removable cap 26, described hereinafter, is shown on the auxiliary valve chamber or cap 15.

To inflate the tire it is only necessary to apply the air-hose nozzle (the cap 26 being removed) to the end of the cap 15. This depresses the auxiliary valve plunger 21 and the valve-head 24, thereby opening a passage for the compressed air. At the same time the plunger 21 depresses the valve plunger 25, thereby opening the tire valve. When the air hose is removed the spring 24 raises the plunger or rod 21, jamming the valve head 24 snugly into its tapered seat and permitting the plunger 25 to rise and close the tire valve.

The washers or gaskets 16, 17 and 24 may be made of any suitable material. 16 and 17 are preferably made of soft metal and 24 of soft rubber.

To cover and protect the unsightly threads on the valve stem 12 I provide a casing composed of a pair of telescoping tubular members or shells 27, 28, the first inner end, threaded to screw down on the valve stem and seat firmly on the nut 13. Member 28 fits snugly but smoothly inside of the other, and the two are preferably so proportioned, as to diameter and thickness, that the inner surface of member 28 is close to or in contact with the valve stem. The outer member is provided with a series of inner circumferential grooves 30, and the inner is formed at its lower end with a circumferential rib 31 to cooperate with the aforesaid grooves. Its lower end may also be slotted upwardly, as shown at 32, to provide a suitable number of ribbed, inwardly yielding tongues, as will be readily understood. The upper or outer end of member 28 has an opening 33 to receive the cap or auxiliary valve casing 15.

In assembling the sleeves or members 27, 28, the two are adjusted together to bring the rib 31 into the particular groove 30 which will give the whole a suitable length, such, for example, as will bring the outer end of sleeve 28 about half way up the cap 15. In making this adjustment the spring tongues at the end of sleeve 28 yield or flex as the rib 31 passes between the successive grooves. The casing formed by the two sleeves is then screwed down upon the valve stem as in Fig. 1. If now the annular space between the valve stem and the inner sleeve is less than the thickness of the rib 31 the sleeve cannot be pulled out of the outer sleeve, for the reason that the spring tongues cannot yield inwardly far enough to permit the locking rib 31 to be disengaged from the groove in which it is seated. The casing formed by the two sleeves therefore cannot be lengthened or shortened without unscrewing the same from the valve stem at least far enough to bring the inner end of the inner sleeve above the shoulder on the lower part of the auxiliary valve chamber 15; the net result being that when fitted on the valve stem the two sleeves are in effect one. The casing is, however, adjustable in length to fit stems which protrude different distances through the felly.

Figure 3:
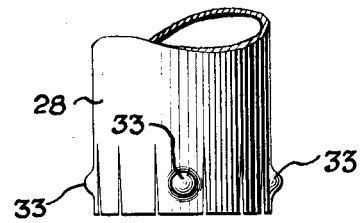
Fig. 3 is a detail side view showing a modification of the inner member.

Instead of a rib 31 the inner sleeve may be provided with a circumferential series of lugs or bosses, 33 Fig. 3, preferably on spring tongues formed by slotting the end of the sleeve, though if the metal is thin and only a few bosses are provided, sufficient yield can be obtained without slotting.

Figure 4:
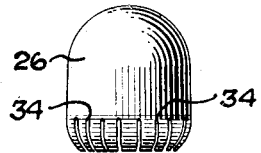
Fig. 4 is a detail side view of the preferred form of top-cap provided for the auxiliary valve-cap of the type shown in the Stephens patent mentioned above.

If necessary or desirable to protect the upper end of the auxiliary valve chamber 15 and the projecting end of the plunger 21 a cap may be provided therefor, for example the cap 26. As shown in Fig. 4 the lower edge of the cap is bent inwardly and is slotted axially to form spring tongues 34 for engagement with a circumferential groove 35 near the top of the valve chamber, metal thick and stiff enough to prevent removal of the cap by a straight pull, and requiring it to be " rocked " off by a rather firm pressure laterally against its upper end.

It is to be understood that the invention is not limited to the construction herein specifically illustrated and described but can be embodied in other forms without departure from its spirit.

I claim:

1. The combination with a valve stem, of an adjustable casing or cover therefor, comprising a pair of telescoping sleeves one being circumferentially grooved and the other ribbed for cooperating engagement to releasably hold the same in adjusted position relative to each other, and one of the sleeves having means for removably securing the same on the valve stem.

2. The combination with a valve stem, of a casing or cover therefor of variable length, comprising a pair of sleeves capable of telescoping adjustment, one sleeve being circumferentially grooved and the other ribbed to provide yielding inter-engaging means to releasably hold the sleeves in adjusted position and fitted to the valve stem closely so as to prevent said engaging means from yielding when the sleeves are mounted on the valve stem; and one of said sleeves having means for removably mounting it on the valve stem.

3. The combination with a threaded valve stem, of a casing therefor, comprising a sleeve threaded internally to screw down upon the valve stem, a sleeve adapted to telescope into the first between the same and the valve stem, one of the sleeves being circumferentially grooved and the other ribbed to provide mutually engaging means, the engaging means on the inner sleeve being adapted to yield inwardly as the sleeves are adjusted relatively to each other.

4. The combination with a threaded valve stem, of a casing therefor, comprising a sleeve threaded internally to screw down upon the valve stem, a sleeve adapted to telescope into the first between the same and the valve stem, one of the sleeves being circumferentially grooved and the other ribbed to provide mutually engaging means, the inner sleeve having its engaging means formed on spring tongues whereby to yield inwardly as the sleeves are adjusted relatively to each other, and said inner sleeve being fitted closely to the valve stem to prevent such inward yield when the casing formed by the sleeves is mounted on the valve stem.

5. A casing or cover for a valve stem, comprising a pair of telescoping sleeves, the outer sleeve having a plurality of inner rib to cooperate with any of the grooves in the other, and said inner sleeve being slotted across the rib thereon to permit inward yielding of the rib during relative sliding movement of the sleeves.

6. A valve stem casing or cover as described in claim 5, in which the outer end of the inner sleeve is open to pass over a cap seated on the end of the valve stem.

7. A casing or cover for a valve stem comprising an outer sleeve and a telescoping inner sleeve, having rib and groove interother, the interengaging means on the inner sleeve being formed on spring tongues to permit yielding of the same during adjustment and said inner sleeve being adapted to fit the valve stem whereby to prevent yielding of said spring tongues when the casing or cover is mounted on the valve stem.

In testimony whereof I hereto affix my signature.

WILLIAM R. ROYER.